United States Patent
Zha et al.

(10) Patent No.: US 10,496,108 B2
(45) Date of Patent: Dec. 3, 2019

(54) COOLING SYSTEM FLOOD PREVENTION TOOL

(71) Applicant: Heatcraft Refrigeration Products LLC, Stone Mountain, GA (US)

(72) Inventors: Shitong Zha, Snellville, GA (US); Douglas Cole, Columbus, GA (US)

(73) Assignee: Heatcraft Refrigeration Products LLC, Stone Mountain, GA (US)

( * ) Notice: Subject to any disclaimer, the term of this patent is extended or adjusted under 35 U.S.C. 154(b) by 127 days.

(21) Appl. No.: 15/654,385

(22) Filed: Jul. 19, 2017

(65) Prior Publication Data

US 2019/0025859 A1    Jan. 24, 2019

(51) Int. Cl.
*G05D 7/06*      (2006.01)
*G01L 27/00*    (2006.01)
(Continued)

(52) U.S. Cl.
CPC .............. *G05D 7/0623* (2013.01); *F25B 1/10* (2013.01); *F25B 5/02* (2013.01); *F25B 9/008* (2013.01);
(Continued)

(58) Field of Classification Search
CPC .. G05D 7/0623; G05D 23/1333; G05B 11/56; G01M 3/184; G01L 27/007; F25B 5/02; F25B 43/006; F25B 49/02; F25B 43/02; F25B 1/10; F25B 2400/075; F25B 2400/13; F25B 2400/22; F25B 2400/23;
(Continued)

(56) References Cited

U.S. PATENT DOCUMENTS 5,263,333 A * 11/1993 Kubo .................. F24F 3/065
                                                                    62/160
5,502,970 A *  4/1996 Rajendran .......... F25B 41/062
                                                                    62/115
(Continued)

FOREIGN PATENT DOCUMENTS

AU      2016101310 A4    8/2016
CN         104613662 A    5/2015
WO      2011054396 A1    5/2011

OTHER PUBLICATIONS

European Patent Office, Extended European Search Report, Application No. 18182327.9, dated Dec. 13, 2018, 9 pages.

*Primary Examiner* — Melvin Jones
(74) *Attorney, Agent, or Firm* — Baker Botts L.L.P.

(57) ABSTRACT

A flood prevention system includes a first load, a second load, a third load, a fourth load, a first compressor, a first temperature sensor, a second temperature sensor, and a controller. The first, second, third, and fourth loads are configured to use a refrigerant to remove heat from a first, second, third, and fourth space, respectively, proximate to the first, second, third, and fourth load, respectively. The first compressor is configured to compress the refrigerant from the fourth load. The first temperature sensor is configured to detect a first temperature of the refrigerant from the first load, the second load, and the third load. The second temperature sensor is configured to detect a second temperature of the refrigerant from the first load, the second load, the third load, and the compressor. The controller is configured to trigger an alarm in response to certain conditions.

33 Claims, 3 Drawing Sheets

(51) Int. Cl.
*G01M 3/18* (2006.01)
*G05B 23/02* (2006.01)
*F25B 1/10* (2006.01)
*F25B 5/02* (2006.01)
*F25B 9/00* (2006.01)
*G05B 11/56* (2006.01)
*G05D 23/13* (2006.01)

(52) U.S. Cl.
CPC ........... *G01L 27/007* (2013.01); *G01M 3/184* (2013.01); *G05B 23/027* (2013.01); *F25B 2400/075* (2013.01); *F25B 2400/13* (2013.01); *F25B 2400/22* (2013.01); *F25B 2400/23* (2013.01); *F25B 2500/28* (2013.01); *F25B 2600/21* (2013.01); *F25B 2700/21151* (2013.01); *F25B 2700/21175* (2013.01); *G05B 11/56* (2013.01); *G05D 23/1333* (2013.01)

(58) Field of Classification Search
CPC .............. F25B 2500/28; F25B 2600/21; F25B 2700/21151; F25F 27/02; F25D 23/068
See application file for complete search history.

(56) References Cited

U.S. PATENT DOCUMENTS

| | | | |
|---|---|---|---|
| 9,733,009 B2 | 8/2017 | Lee et al. | |
| 2004/0117330 A1* | 6/2004 | Ehlers | G06Q 10/10 705/412 |
| 2008/0041077 A1* | 2/2008 | Tutunoglu | F25D 19/00 62/186 |
| 2016/0061508 A1* | 3/2016 | Lowrimore | F24H 4/02 62/160 |
| 2016/0102901 A1 | 4/2016 | Christensen et al. | |

* cited by examiner

COOLING SYSTEM FLOOD PREVENTION TOOL

TECHNICAL FIELD

This disclosure relates generally to a cooling system.

BACKGROUND

Cooling systems cycle a refrigerant to cool various spaces. For example, a refrigeration system may cycle refrigerant to cool spaces near or around a refrigeration unit. As another example, an air conditioning system may cycle refrigerant to cool a room.

SUMMARY OF THE DISCLOSURE

According to one embodiment, a flood prevention system includes a first load, a second load, a third load, a fourth load, a first compressor, a first temperature sensor, a second temperature sensor, and a controller. The first load is configured to use a refrigerant to remove heat from a first space proximate to the first load. The second load is configured to use the refrigerant to remove heat from a second space proximate to the second load. The third load is configured to use the refrigerant to remove heat from a third space proximate to the third load. The fourth load is configured to use the refrigerant to remove heat from a fourth space proximate to the fourth load. The first compressor is configured to compress the refrigerant from the fourth load. The first temperature sensor is configured to detect a first temperature of the refrigerant from the first load, the second load, and the third load. The second temperature sensor is configured to detect a second temperature of the refrigerant from the first load, the second load, the third load, and the compressor. The controller is configured to trigger an alarm if a difference between the first temperature and a saturation temperature of the refrigerant is below a first threshold for a first duration of time. The controller is also configured to trigger the alarm if a difference between the second temperature and the saturation temperature is below a second threshold for a second duration of time.

According to another embodiment, a method to prevent flooding includes removing heat from a first space proximate to a first load using a refrigerant. The method also includes removing heat from a second space proximate to a second load using the refrigerant. The method further includes removing heat from a third space proximate to a third load using the refrigerant. The method also includes removing heat from a fourth space using a fourth load using the refrigerant. The method further includes compressing the refrigerant from the fourth load using a compressor. The method also includes detecting a first temperature of the refrigerant from the first load, the second load, and a third load using a first temperature sensor. The method further includes detecting a second temperature of the refrigerant from the first load, the second load, the third load, and the compressor using a second temperature sensor. The method also includes triggering an alarm if a difference between the first temperature and a saturation temperature of the refrigerant is below a first threshold for a first duration of time. The method further includes triggering an alarm if a difference between the second temperature and the saturation temperature is below a second threshold for a second duration of time.

According to yet another embodiment, a flood prevention system includes a high side heat exchanger, a flash tank, a first load, a second load, a third load, a fourth load, a first compressor, a first temperature sensor, a second temperature sensor, and a controller. The high side heat exchanger is configured to remove heat from a refrigerant. The flash tank is configured to store the refrigerant from the high side heat exchanger. The first load is configured to use the refrigerant from the flash tank to remove heat from a first space proximate to the first load. The second load is configured to use the refrigerant from the flash tank to remove heat from a second space proximate to the second load. The third load is configured to use the refrigerant from the flash tank to remove heat from a third space proximate to the third load. The fourth load is configured to use the refrigerant from the flash tank to remove heat from a fourth space proximate to the fourth load. The first compressor is configured to compress the refrigerant from the fourth load. The first temperature sensor is configured to detect a first temperature of the refrigerant from the first load, the second load, and the third load. The second temperature sensor is configured to detect a second temperature of the refrigerant from the first load, the second load, the third load, and the first compressor. The controller is configured to trigger an alarm if a difference between the first temperature and a saturation temperature of the refrigerant is below a first threshold for a first duration of time. The controller is also configured to trigger the alarm if a difference between the second temperature and the saturation temperature is below a second threshold for a second duration of time.

Certain embodiments may provide one or more technical advantages. For example, an embodiment prevents flooding of liquid refrigerant back into the compressor. Certain embodiments may prevent flooding of liquid refrigerant back into the compressor without the need for installing additional or expensive hardware to the cooling system. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
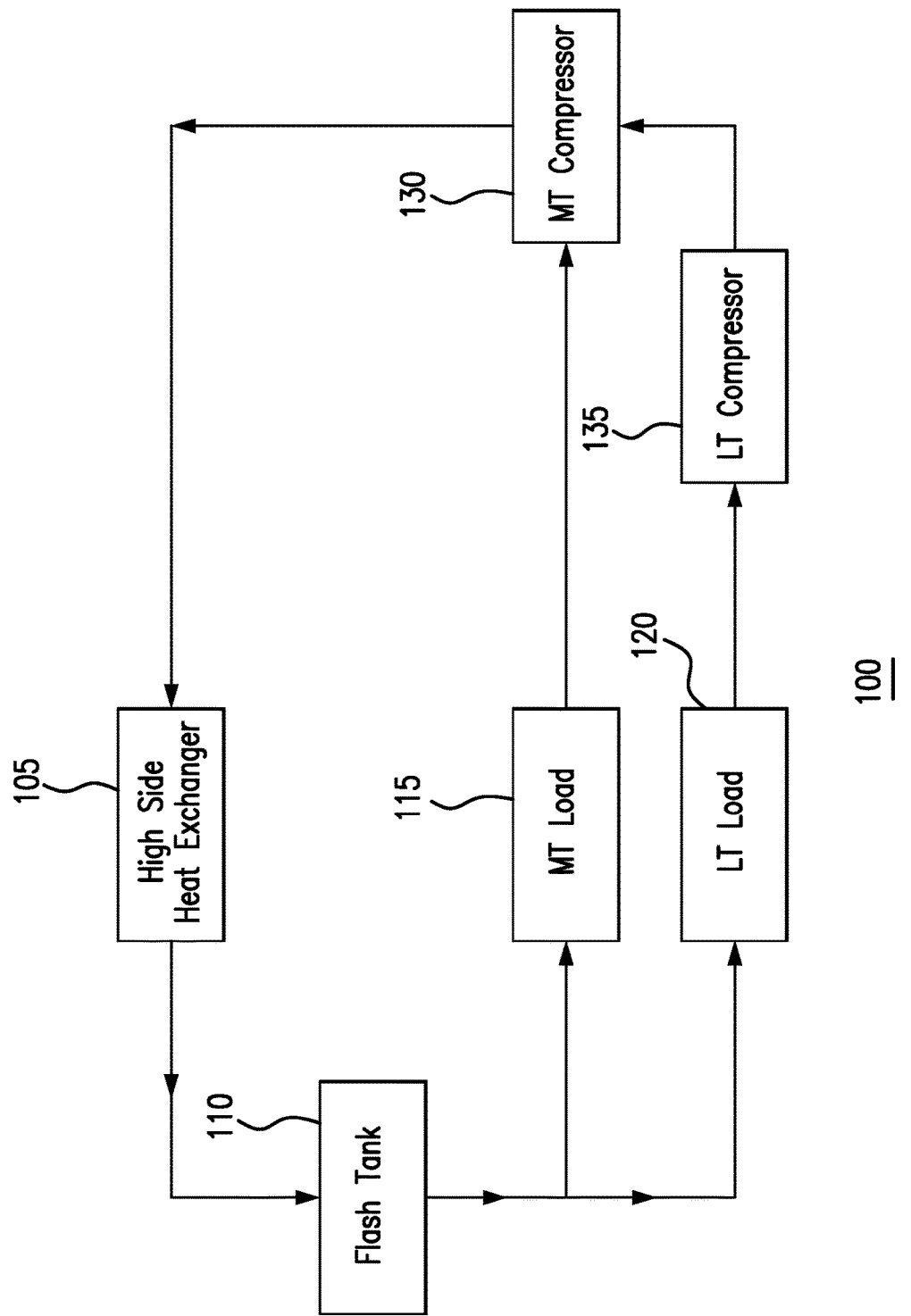
FIG. 1 illustrates an example cooling system.
Figure 2:
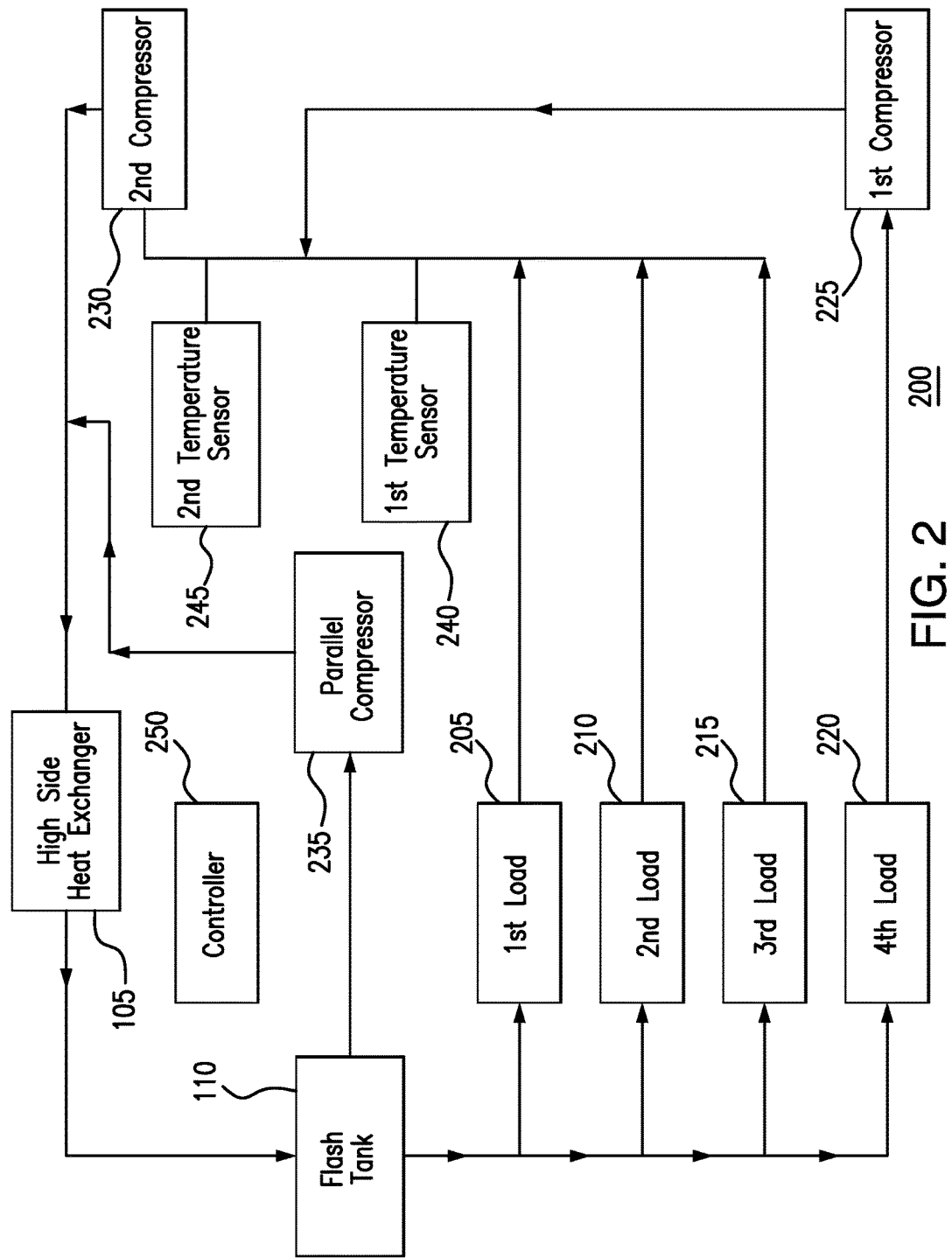
FIG. 2 illustrates an example cooling system including a flood prevention system, according to certain embodiments.
Figure 3:
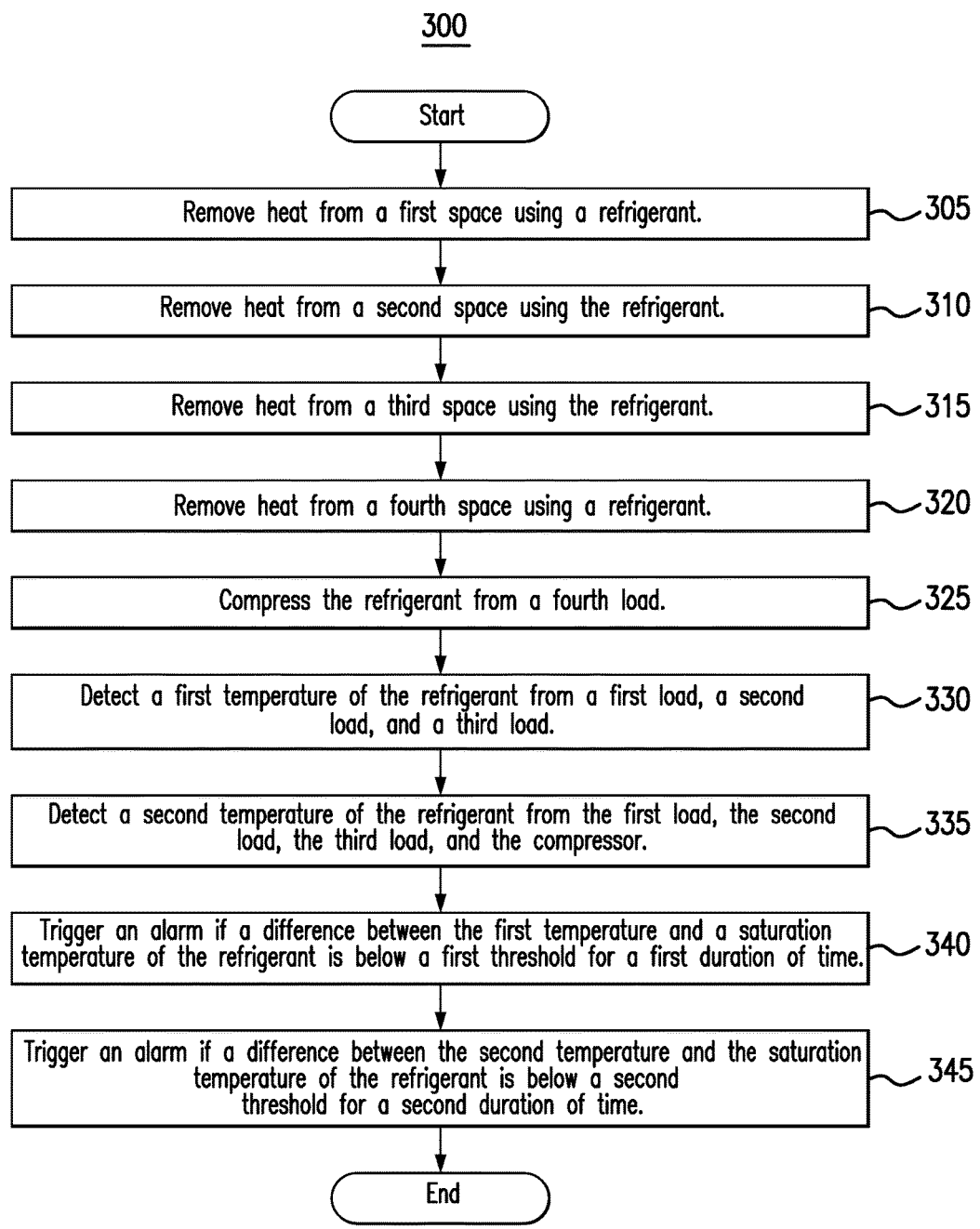
FIG. 3 is a flowchart illustrating a method of operating the example cooling system of FIG. 2.

Embodiments of the present disclosure and its advantages are best understood by referring to FIGS. 1 through 3 of the drawings, like numerals being used for like and corresponding parts of the various drawings.

Cooling systems may cycle a refrigerant to cool various spaces. For example, a refrigeration system may cycle refrigerant to cool spaces near or around refrigeration loads. In certain installations, such as at a grocery store for example, a refrigeration system may include different types of loads. For example, a grocery store may use medium temperature loads and low temperature loads. The medium temperature loads may be used for produce and the low temperature loads may be used for frozen foods. The compressors for these loads may be chained together. For example, the discharge of the low temperature compressor for the low temperature load may be fed into the medium temperature compressor that also compresses the refrigerant from the medium temperature loads. The discharge of the medium temperature compressor is then fed to a high side heat exchanger that removes heat from the compressed refrigerant.

In cooling systems, there is a need to prevent flooding of liquid refrigerant back to a compressor. Flooding of liquid refrigerant back to the compressor may damage the compressor. Flooding may occur, for example, if there is a valve malfunction. Flooding may also occur if the refrigerant has not absorbed enough heat, due to, for example, low superheat in the suction line. In traditional cooling systems, flood prevention may be addressed through use of additional hardware in the cooling system. For example, hardware may inject hot gas, or return medium temperature discharge, into the suction line to evaporate some liquid refrigerant before it floods back to the compressor. Traditional cooling systems could also, for example, install a heat exchanger to again add some heat back into the system. By way of another example, traditional cooling systems could install an accumulator.

This disclosure contemplates an alternative or additional flood prevention tool. This disclosure contemplates controlling ratios between refrigeration loads to prevent flooding back to the compressor. In some embodiments, the system uses a tiered approach to the ratios of refrigeration loads to prevent flooding. In certain embodiments, when certain temperatures are detected, the system deactivates certain refrigeration loads most likely to flood. In certain embodiments, the present disclosure contemplates decreasing the portions of cooler refrigeration loads in the system, which have the potential to flood back to the compressor, and thereby increase the ratio of warmer refrigeration loads in the system, which have a lower potential to flood. Advantages of the present disclosure include preventing compressor flooding without the need for installing additional hardware into the refrigeration system.

The system will be described in more detail using FIGS. 1 through 3. FIG. 1 will describe an existing refrigeration system. FIGS. 2 and 3 will describe the refrigeration system including a flood prevention system.

FIG. 1 illustrates an example cooling system 100. As shown in FIG. 1, system 100 includes a high side heat exchanger 105, a flash tank 110, a medium temperature load 115, a low temperature load 120, a medium temperature compressor 130, and a low temperature compressor 135.

High side heat exchanger 105 may remove heat from a refrigerant. When heat is removed from the refrigerant, the refrigerant is cooled. This disclosure contemplates high side heat exchanger 105 being operated as a condenser, a fluid cooler, and/or a gas cooler. When operating as a condenser, high side heat exchanger 105 cools the refrigerant such that the state of the refrigerant changes from a gas to a liquid. When operating as a fluid cooler, high side heat exchanger 105 cools liquid refrigerant and the refrigerant remains a liquid. When operating as a gas cooler, high side heat exchanger 105 cools gaseous refrigerant and the refrigerant remains a gas. In certain configurations, high side heat exchanger 105 is positioned such that heat removed from the refrigerant may be discharged into the air. For example, high side heat exchanger 105 may be positioned on a rooftop so that heat removed from the refrigerant may be discharged into the air. As another example, high side heat exchanger 105 may be positioned external to a building and/or on the side of a building.

Flash tank 110 may store refrigerant received from high side heat exchanger 105. This disclosure contemplates flash tank 110 storing refrigerant in any state such as, for example, a liquid state and/or a gaseous state. Refrigerant leaving flash tank 110 is fed to low temperature load 120 and medium temperature load 115. In some embodiments, a flash gas and/or a gaseous refrigerant is released from flash tank 110. By releasing flash gas, the pressure within flash tank 110 may be reduced.

System 100 may include a low temperature portion and a medium temperature portion. The low temperature portion may operate at a lower temperature than the medium temperature portion. In some refrigeration systems, the low temperature portion may be a freezer system and the medium temperature system may be a regular refrigeration system. In a grocery store setting, the low temperature portion may include freezers used to hold frozen foods, and the medium temperature portion may include refrigerated shelves used to hold produce. Refrigerant may flow from flash tank 110 to both the low temperature and medium temperature portions of the refrigeration system. For example, the refrigerant may flow to low temperature load 120 and medium temperature load 115. When the refrigerant reaches low temperature load 120 or medium temperature load 115, the refrigerant removes heat from the air around low temperature load 120 or medium temperature load 115. As a result, the air is cooled. The cooled air may then be circulated such as, for example, by a fan to cool a space such as, for example, a freezer and/or a refrigerated shelf. As refrigerant passes through low temperature load 120 and medium temperature load 115, the refrigerant may change from a liquid state to a gaseous state as it absorbs heat.

Refrigerant may flow from low temperature load 120 and medium temperature load 115 to compressors 130 and 135. This disclosure contemplates system 100 including any number of low temperature compressors 135 and medium temperature compressors 130. The low temperature compressor 135 and medium temperature compressor 130 may be configured to increase the pressure of the refrigerant. As a result, the heat in the refrigerant may become concentrated and the refrigerant may become a high pressure gas. Low temperature compressor 135 may compress refrigerant from low temperature load 120 and send the compressed refrigerant to medium temperature compressor 130. Medium temperature compressor 130 may compress refrigerant from low temperature compressor 135 and medium temperature load 115. Medium temperature compressor 130 may then send the compressed refrigerant to high side heat exchanger 105.

As shown in FIG. 1, the discharge of low temperature compressor 135 is fed to medium temperature compressor 130. Medium temperature compressor 130 then compresses the refrigerant from medium temperature load 115 and low temperature compressor 135. As additional low temperature loads and/or low temperature compressors are added to system 100, the temperature of the refrigerant entering medium temperature compressor 130 increases and the strain on medium temperature compressor 130 increases.

FIG. 2 illustrates an example cooling system 200. As shown in FIG. 2, system 200 includes high side heat exchanger 105, a first load 205, a second load 210, a third load 215, a fourth load 220, a first compressor 225, a second compressor 230, a first temperature sensor 240, a second temperature sensor 245, a controller 250, a parallel compressor 235, and a flash tank 110. System 200 includes several components that are also in system 100. These components may operate similarly as they did in system 100.

However, the components of system 200 may be configured differently than the components of system 100 to integrate flood protection. In particular embodiments, system 200 protects second compressor 230 from flooding of liquid refrigerant. Flooding of liquid refrigerant back to second compressor 230 may damage second compressor 230.

In system 200, high side heat exchanger 105 may receive refrigerant from second compressor 230. In certain embodiments, high side heat exchanger 105 may also receive refrigerant from parallel compressor 235. As in system 100, high side heat exchanger 105 may remove heat from a refrigerant. When heat is removed from the refrigerant, the refrigerant is cooled. In system 200, high side heat exchanger 105 may direct the refrigerant to flash tank 110.

As illustrated in FIG. 1, flash tank 110 may store refrigerant received from high side heat exchanger 105. This disclosure contemplates flash tank 110 storing refrigerant in any state such as, for example, a liquid state and/or a gaseous state. In system 200, refrigerant leaving flash tank 110 is fed to first load 205, second load 210, third load 215, and fourth load 220. In some embodiments, a flash gas and/or a gaseous refrigerant is released from flash tank 110. By releasing flash gas, the pressure within flash tank 110 may be reduced. In some embodiments, flash tank 110 releases a flash gas to parallel compressor 235. Parallel compressor 235 may compress the flash gas from flash tank 110.

Refrigerant may flow from first load 205, second load 210, third load 215, and fourth load 220 to compressors of system 200. This disclosure contemplates system 200 including any number of compressors. In some embodiments refrigerant from fourth load 220 flows to first compressor 225. In yet other embodiments, refrigerant from first load 205, second load 210, and third load 215 flows to second compressor 230. First compressor 225 and second compressor 230 may increase the pressure of the refrigerant. As a result, the heat in the refrigerant may become concentrated and the refrigerant may become high pressure gas. First compressor 225 may compress refrigerant from fourth load 220 and send the compressed refrigerant to second compressor 230. Second compressor 230 may compress refrigerant from first compressor 225 and first load 205, second load 210, and third load 215. Second compressor 230 may then send the compressed refrigerant to high side heat exchanger 105.

Temperature sensors of system 200 may detect the temperature of a refrigerant. This disclosure contemplates system 200 including any number of temperature sensors. This disclosure further contemplates temperature sensors 240 and/or 245 detecting any number of temperatures of the refrigerants. A first temperature sensor 240 may detect a first temperature of a mixture of the refrigerant coming from first load 205, second load 210, and third load 215. Second temperature sensor 245 may detect a second temperature of a mixture of the refrigerant coming from first compressor 225, first load 205, second load 210, and third load 215. In some embodiments, second temperature sensor 245 detects a third temperature of flash gas from flash tank 110 mixed with the refrigerant from first load 205, second load 210, third load 215, and first compressor 225.

Controller 250 may trigger an alarm or deactivate loads of refrigerant in response to temperatures sensed by first temperature sensor 240 and/or a second temperature sensor 245. Controller 250 may trigger an alarm if a temperature of the mixture of the refrigerant in first load 205, second load 210, and third load 215 is within a first threshold of the temperature in which the refrigerant changes from a liquid to a gas (or saturation temperature) for a first duration of time. For example, controller 250 may trigger an alarm if the difference between the first temperature and the saturation temperature of the refrigerant is less than 10 Rankin for at least thirty seconds. Controller 250 may further trigger the alarm if the temperature of the refrigerant from first compressor 225, first load 205, second load 210, and third load 215 is within a second threshold of the saturation temperature of the refrigerant for a second duration of time. For example, controller 250 may trigger an alarm if the difference between the second temperature and the saturation temperature of the refrigerant is less than 15 Rankin for at least thirty seconds.

In some embodiments, controller 250 deactivates third load 215 if the temperature of the mixture of the refrigerant from first compressor 225, first load 205, second load 210, and third load 215 is within a third threshold of the saturation temperature of the refrigerant for a third duration of time. For example, controller 250 may deactivate third load 215 if the difference between the second temperature and the saturation temperature of the refrigerant less than 10 Rankin for at least thirty seconds. In other embodiments, controller 250 deactivates second load 210 and third load 215 if the temperature of the mixture of the refrigerant from the first compressor 225, first load 205, second load 210, and third load 215 is within a third threshold of the saturation temperature for a third duration of time. For example, controller 250 may deactivate second load 210 and third load 215 if the difference between the second temperature and the saturation temperature of the refrigerant is less than 5 Rankin at least fifteen seconds. In yet other embodiments, controller 250 deactivates first load 205, second load 210, and third load 215 if the temperature of the refrigerant from first compressor 225, first load 205, second load 210, and third load 215 is within a third threshold of the saturation temperature of the refrigerant for a third duration of time. For example, controller 250 may deactivate first load 205, second load 210, and third load 215 if the difference between the second temperature and the saturation temperature of the refrigerant is less than 3 Rankin for at least ten seconds.

The first threshold, second threshold, and third threshold may be any range of temperature differences between a temperature measured by a temperature sensor and the saturation temperature of the refrigerant. This disclosure contemplates the first threshold, second threshold, and third threshold being the same or different thresholds. The first duration of time, second duration of time, and third duration of time may be any range of time durations suitable to prevent flooding of liquid refrigerant back to a compressor of the system. This disclosure contemplates the first duration of time, second duration of time, and third duration of time being the same or different durations of time.

As a result, in certain embodiments, system 200 implements a tiered approach to the ratios of refrigeration loads to prevent flooding. In certain embodiments, when certain temperatures are detected, controller 250 deactivates certain refrigeration loads most likely to flood. As a result, controller 250 may decrease the portion of cooler refrigeration loads in system 200 that have the potential to flood back to compressor 230 and/or compressor 235, and thereby increase the ratio of warmer refrigeration loads in system 200, that have a lower potential to flood.

In some embodiments, system 200 includes parallel compressor 235. Parallel compressor 235 may increase the pressure of the refrigerant. As a result, the heat in the refrigerant may become concentrated and the refrigerant may become a high pressure gas. Parallel compressor 235 may receive flash gas discharged from flash tank 110 and compress the flash gas. Parallel compressor 235 may compress the flash gas and send the compressed flash gas to high side heat exchanger 105.

This disclosure contemplates system 200 including any number of components. For example, system 200 may include any number of loads 105, 210, 215, and/or 220. As another example, system 200 may include any number of compressors 225, 230, and/or 235. As further example, system 200 may include any number of temperature sensors 240 and/or 245. As yet another example, system 200 may include any number of high side heat exchangers 105 and flash tanks 115. This disclosure also contemplates cooling system 200 using any appropriate refrigerant. For example, cooling system 200 may use a carbon dioxide refrigerant.

FIG. 3 is a flowchart illustrating a method 300 of operating the example cooling system 200 of FIG. 2. Various components of system 200 perform the steps of method 300. In certain embodiments, performing method 300 may prevent flooding of liquid refrigerant to compressors of system 200.

High side heat exchanger 105 may begin by removing heat from a refrigerant in step 305. In step 310, first load 205 may remove heat from a first space proximate to first load 205. Then in step 315, second load 210 may remove heat from a second space proximate to second load 210. In step 315, third load 215 may remove heat from a third space proximate to third load 215. In step 320, fourth load 220 may remove heat from a fourth space proximate to fourth load 220. In step 325, first compressor 225 may compress the refrigerant from fourth load 220. In step 330, first temperature sensor 240 may detect a first temperature of the refrigerant from first load 205, second load 210, and third load 215. In step 335, second temperature sensor 245 may detect a second temperature of the refrigerant from first load 205, second load 210, third load 215, and first compressor 225. In step 340, controller 250 may trigger an alarm if a difference between the first temperature and a saturation temperature of the refrigerant is below a first threshold for a first duration of time. In step 345, controller 250 may trigger an alarm if a difference between the second temperature and the saturation temperature of the refrigerant is below a second threshold for a second duration of time.

Modifications, additions, or omissions may be made to method 300 depicted in FIG. 3. Method 300 may include more, fewer, or other steps. For example, steps may be performed in parallel or in any suitable order. While discussed as various components of cooling system 200 performing the steps, any suitable component or combination of components of system 200 may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A flood prevention system comprising:
a first load configured to use a refrigerant to remove heat from a first space proximate to the first load;
a second load configured to use the refrigerant to remove heat from a second space proximate to the second load;
a third load configured to use the refrigerant to remove heat from a third space proximate to the third load;
a fourth load configured to use the refrigerant to remove heat from a fourth space proximate to the fourth load;
a first compressor configured to compress the refrigerant from the fourth load;
a first temperature sensor configured to detect a first temperature of the refrigerant from the first load, the second load, and the third load;
a second temperature sensor configured to detect a second temperature of the refrigerant from the first load, the second load, the third load, and the compressor; and
a controller configured to:
trigger an alarm if a difference between the first temperature and a saturation temperature of the refrigerant is below a first threshold for a first duration of time; and
trigger the alarm if a difference between the second temperature and the saturation temperature is below a second threshold for a second duration of time.

2. The system of claim 1, wherein the controller further configured to deactivate the third load if the difference between the second temperature and the saturation temperature is below a third threshold for a third duration of time.

3. The system of claim 1, wherein the controller further configured to deactivate the second load and the third load if the difference between the second temperature and the saturation temperature is below a third threshold for a third duration of time.

4. The system of claim 1, wherein the controller further configured to deactivate the first load, the second load, and the third load if the difference between the second temperature and the saturation temperature is below a third threshold for a third duration of time.

5. The system of claim 1, further comprising a second compressor configured to compress the refrigerant from the first load, the second load, the third load, and the first compressor.

6. The system of claim 1, further comprising:
a flash tank configured to store the refrigerant; and
a parallel compressor configured to compress a flash gas from the flash tank.

7. The system of claim 6, wherein the second temperature sensor is further configured to detect a third temperature of the flash gas from the flash tank mixed with the refrigerant from the first load, the second load, the third load, and the first compressor.

8. A method to prevent flooding comprising:
removing heat from a first space proximate to a first load using a refrigerant;
removing heat from a second space proximate to a second load using the refrigerant;
removing heat from a third space proximate to a third load using the refrigerant;
removing heat from a fourth space using a fourth load using the refrigerant;
compressing the refrigerant from the fourth load using a compressor;
detecting a first temperature of the refrigerant from the first load, the second load, and a third load using a first temperature sensor;
detecting a second temperature of the refrigerant from the first load, the second load, the third load, and the compressor using a second temperature sensor;
triggering an alarm if a difference between the first temperature and a saturation temperature of the refrigerant is below a first threshold for a first duration of time; and
triggering an alarm if a difference between the second temperature and the saturation temperature is below a second threshold for a second duration of time.

9. The method of claim 8, further comprising deactivating the third load if the difference between the second temperature and the saturation temperature is below a third threshold for a third duration of time.

10. The method of claim 8, further comprising deactivate the second load and the third load if the difference between the second temperature and the saturation temperature is below a third threshold for a third duration of time.

11. The method of claim 8, further comprising deactivating the first load, the second load, and the third load if the difference between the second temperature and the saturation temperature is below a third threshold for a third duration of time.

12. The method of claim 8, further comprising compressing the refrigerant from the first load, the second load, the third load, and the first compressor using a second compressor.

13. The method of claim 8, further comprising:
storing the refrigerant using a flash tank; and
compressing a flash gas from the flash tank using a parallel compressor.

14. The method of claim 13, further comprising detecting a third temperature of the flash gas from the flash tank mixed with the refrigerant from the first load, the second load, the third load, and the first compressor using the second temperature sensor.

15. A flood prevention system comprising:
a high side heat exchanger configured to remove heat from a refrigerant;
a flash tank configured to store the refrigerant from the high side heat exchanger;
a first load configured to use the refrigerant from the flash tank to remove heat from a first space proximate to the first load;
a second load configured to use the refrigerant from the flash tank to remove heat from a second space proximate to the second load;
a third load configured to use the refrigerant from the flash tank to remove heat from a third space proximate to the third load;
a fourth load configured to use the refrigerant from the flash tank to remove heat from a fourth space proximate to the fourth load;
a first compressor configured to compress the refrigerant from the fourth load;
a first temperature sensor configured to detect a first temperature of the refrigerant from the first load, the second load, and the third load;
a second temperature sensor configured to detect a second temperature of the refrigerant from the first load, the second load, the third load, and the first compressor; and
a controller configured to:
trigger an alarm if a difference between the first temperature and a saturation temperature of the refrigerant is below a first threshold for a first duration of time; and
trigger the alarm if a difference between the second temperature and the saturation temperature is below a second threshold for a second duration of time.

16. The system of claim 15, wherein the controller further configured to deactivate the third load if the difference between the second temperature and the saturation temperature is below a third threshold for a third duration of time.

17. The system of claim 15, wherein the controller further configured to deactivate the second load and the third load if the difference between the second temperature and the saturation temperature is below a third threshold for a third duration of time.

18. The system of claim 15, wherein the controller further configured to deactivate the first load, the second load, and the third load if the difference between the second temperature and the saturation temperature is below a third threshold for a third duration of time.

19. The system of claim 15, further comprising a second compressor configured to compress the refrigerant from the first load, the second load, the third load, and the first compressor.

20. The system of claim 15, further comprising a parallel compressor configured to compress a flash gas from the flash tank.

21. The system of claim 20, wherein the second temperature sensor is further configured to detect a third temperature of the flash gas from the flash tank mixed with the refrigerant from the first load, the second load, the third load, and the first compressor.

22. The system of claim 1, wherein:
the first duration of time is at least thirty seconds; and
the second duration of time is at least thirty seconds.

23. The system of claim 2, wherein:
the first duration of time is at least thirty seconds;
the second duration of time is at least thirty seconds; and
the third duration of time is at least thirty seconds.

24. The system of claim 3, wherein:
the first duration of time is at least thirty seconds;
the second duration of time is at least thirty seconds; and
the third duration of time is at least fifteen seconds.

25. The system of claim 4, wherein:
the first duration of time is at least thirty seconds;
the second duration of time is at least thirty seconds; and
the third duration of time is at least ten seconds.

26. The method of claim 8, wherein:
the first duration of time is at least thirty seconds; and
the second duration of time is at least thirty seconds.

27. The method of claim 9, wherein:
the first duration of time is at least thirty seconds;
the second duration of time is at least thirty seconds; and
the third duration of time is at least thirty seconds.

28. The method of claim 10, wherein:
the first duration of time is at least thirty seconds;
the second duration of time is at least thirty seconds; and
the third duration of time is at least fifteen seconds.

29. The method of claim 11, wherein:
the first duration of time is at least thirty seconds;
the second duration of time is at least thirty seconds; and
the third duration of time is at least ten seconds.

30. The system of claim 15, wherein:
the first duration of time is at least thirty seconds; and
the second duration of time is at least thirty seconds.

31. The system of claim 16, wherein:
the first duration of time is at least thirty seconds;
the second duration of time is at least thirty seconds; and
the third duration of time is at least thirty seconds.

32. The system of claim 17, wherein:
the first duration of time is at least thirty seconds;
the second duration of time is at least thirty seconds; and
the third duration of time is at least fifteen seconds.

33. The system of claim 18, wherein:
the first duration of time is at least thirty seconds;
the second duration of time is at least thirty seconds; and
the third duration of time is at least ten seconds.

* * * * *